United States Patent [19]

Cassel

[11] Patent Number: 4,898,398
[45] Date of Patent: Feb. 6, 1990

[54] HIGH PERFORMANCE GRINDING KING PIN AND ASSOCIATED APPARATUS

[76] Inventor: Donald D. Cassel, 54 Rose Ave., #9, Venice, Calif. 90291

[21] Appl. No.: 130,685

[22] Filed: Dec. 9, 1987

[51] Int. Cl.⁴ .................................................. A63C 17/02
[52] U.S. Cl. ............................ 280/87.042; 280/11.28; 411/368; 411/396
[58] Field of Search ............... 280/11.27, 11.28, 87.03, 280/87.041, 87.042, 79.11; 411/184, 185, 187, 368, 369, 379, 380, 396, 537

[56] References Cited

U.S. PATENT DOCUMENTS

| 2,553,450 | 5/1951 | Fuller | 280/11.28 |
| 2,606,768 | 8/1952 | Wagner | 280/11.28 |
| 2,719,725 | 10/1955 | Ware | 280/11.28 |
| 3,862,763 | 1/1975 | Ware | 280/11.28 |
| 4,047,725 | 9/1977 | Pinchock | 280/11.28 |
| 4,047,727 | 9/1977 | Holladay et al. | 280/87.04 A |
| 4,054,297 | 10/1977 | Solimine | 280/11.28 X |
| 4,071,256 | 1/1978 | Kimmell | 280/11.28 |
| 4,518,294 | 5/1985 | Barth | 411/187 X |

FOREIGN PATENT DOCUMENTS

| 15360 | 9/1956 | Fed. Rep. of Germany | 280/11.28 |
| 14324 | 11/1956 | Fed. Rep. of Germany | 280/11.28 |
| 519147 | 3/1955 | Italy | 411/396 |
| 23095 | 8/1912 | United Kingdom | 280/11.28 |
| 845975 | 8/1960 | United Kingdom | 280/11.28 |

Primary Examiner—Charles A. Marmor
Assistant Examiner—Brian Johnson
Attorney, Agent, or Firm—Marc E. Brown

[57] ABSTRACT

Apparatus for attaching a skateboard truck to a skateboard base plate in a manner which does not result in any dangerous protrusions which might cause hang up during use. Included is an elongated member having a head with a cross-sectional area that gradually increases from the outer tip portion of the head in a smooth fashion such that there are no rough or sharply protruding edges or corners.

1 Claim, 2 Drawing Sheets

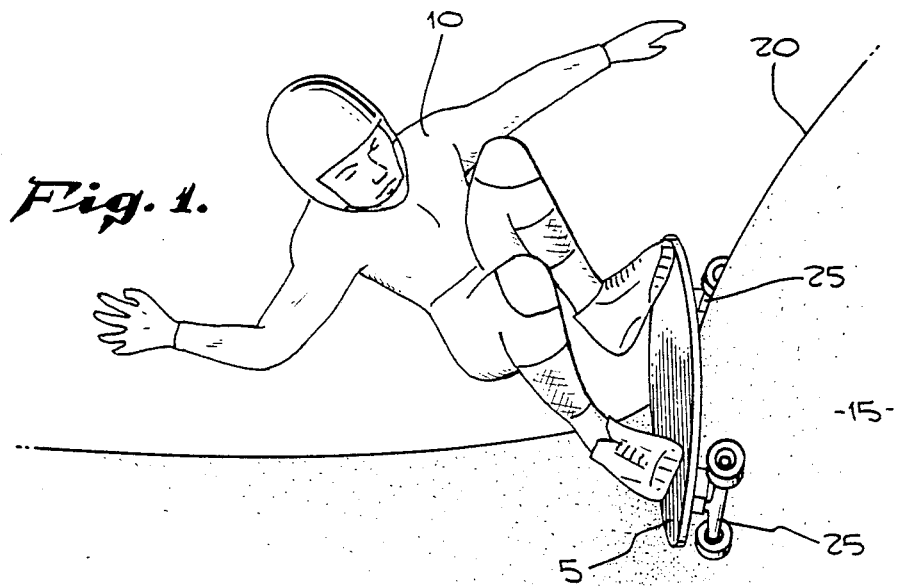
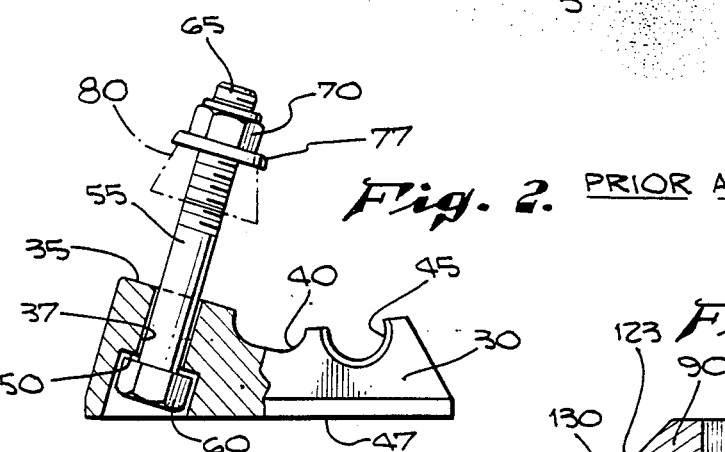
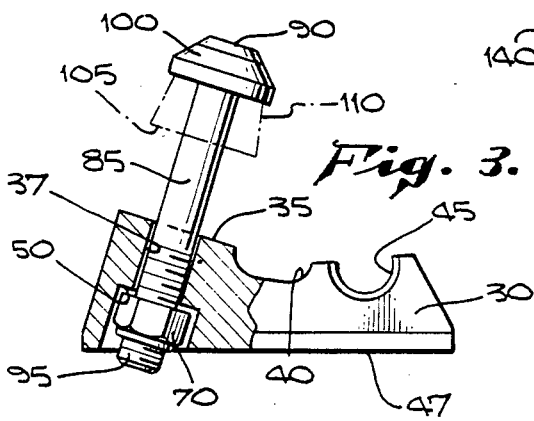
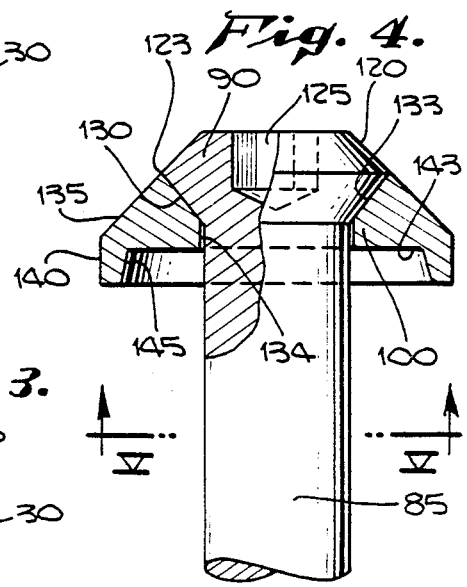

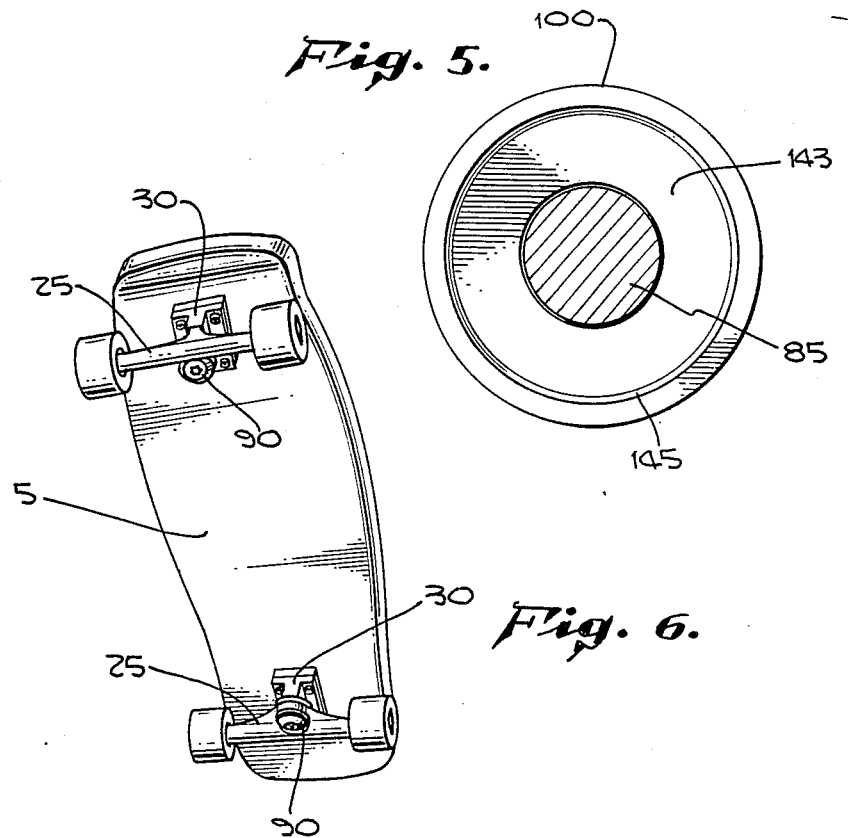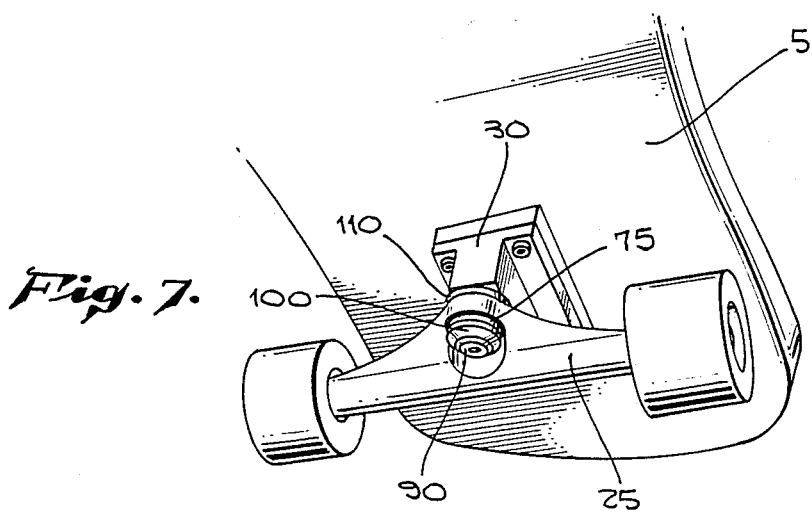

HIGH PERFORMANCE GRINDING KING PIN AND ASSOCIATED APPARATUS

BACKGROUND OF THE INVENTION

1. Field of the Invention

The present invention relates to means for attaching a skateboard truck to a skateboard baseplate without resulting in dangerous protrusions.

2. Description of Related Art

Skateboards are in wide use today. They provide an exciting, entertaining and economic means for travelling quickly.

One significant problem with many of the skateboards being used today is the contact which often occurs between the surface over which the skateboard is being ridden and the shaft of the bolt which has traditionally been used to affix the skateboard truck to the skateboard, especially when one wheel of the truck goes over an edge.

Such a collision causes many problems. It damages the bolt, weakening its structural integrity, and may require periodic replacement of the bolt. It also damages the threads on the bolt, making subsequent adjustment or replacement difficult. And perhaps most significantly, it often causes the skateboard to "hang up", creating a dangerous situation for its rider.

SUMMARY OF THE INVENTION

One object of the present invention is to eliminate these and other problems in the prior art.

Another object of the present invention is to make the structure which attaches the skateboard truck to the skateboard far stronger, easier to adjust, less vulnerable to collision with the riding surface, less vulnerable to thread damage, and less apt to "hang up".

A still further object of the present invention is to provide an inexpensive kit which will allow an owner of an existing prior art skateboard to easily modify his skateboard so as to obtain all of the advantages of the present invention.

These and other objects of the present invention are achieved through the use of a bolt having a specially-tapered head and a mating, specially-tapered washer. Unlike prior art techniques, moreover, the threaded end of the bolt, rather than its head, is positioned inside of the truck assembly.

BRIEF DESCRIPTION OF THE DRAWINGS

FIG. 1 illustrates a vertical skate maneuver in which the driver has just gone over the edge of a wall and is in danger of having a "hang up";

FIG. 2 illustrates the structural details of a prior art bolt assembly;

FIG. 3 illustrates the structural details of a bolt assembly constructed in accordance with the preferred embodiment of the present invention;

FIG. 4 is a partial cross-sectional side view of the preferred embodiment of the bolt and washer of the present invention;

FIG. 5 is a transverse sectional view taken along line V—V of FIG. 4;

FIG. 6 is a perspective view of a skateboard showing the relative position of the front and rear trucks and mounting arrangements; and FIG. 7 is a close up view of the rear truck shown in FIG. 6 showing greater structural detail.

DETAILED DESCRIPTION OF THE PREFERRED EMBODIMENT

FIG. 1 illustrates a skateboard maneuver. Skateboard 5 with rider 10 controlling it has had one wheel of rear truck 25 go over edge 20 of a wall 15. Skateboard 5 and rider 10 are now headed towards the bottom.

FIG. 2 illustrates the details of the hardware traditionally used in the prior art to affix truck 25 to skateboard 5 (both of which have been omitted from FIG. 2 for clarity purposes). The hardware traditionally includes base plate 30 having lower surface 47 which is affixed to the skateboard through means not shown but well known.

Base plate 30 further includes surface 35 and slots 40 and 45 for receiving truck 25.

To secure truck 25 to surface 35 and slots 40 and 45, king pin 55 is used. Specifically, king pin 55 is first inserted into base plate 30 through opening 37 such that its head 60 rests in pocket 50 contained within base plate 30. A compressible bushing (not shown) is then slid over king pin 55 and down to surface 35. Truck 25 is then slid over king pin 55 by positioning an opening in truck 25 (not shown) over the shaft of king pin 55 and pushing it down so that it rests on the compressible bushing. After aligning truck 25 with slots 40 and 45 in base plate 30, a second compressible bushing 80 is slid over king pin 55, followed by washer 77 and nut 70. Nut 70 is then tightened a sufficient amount to insure firm attachment of truck 25 to base plate 30.

As can be seen from FIG. 2, tip 65 of king pin 55 traditionally protrudes beyond the end most portion of nut 70. The protrusion of this tip, however, creates a great danger to the rider, especially when he is performing skate maneuvers such as that shown in FIG. 1.

Specifically, the protrusion of tip 65 creates a danger of skateboard "hang up", typically when one of the two track wheels goes over an edge. In FIG. 1, for example, such a "hang up" may occur as rider 10 is going over edge 20 of pool 15 (as shown). If it does, the skateboard may jam at edge 20 of pool 15, possibly causing rider 10 to loose his footing, tumble to the bottom of the pool, and sustain severe injuries.

Injury to the skateboard is also possible. King pin 55, for example, may become bent and may also suffer injury to its threads. This may impair its attachment strength and may also make it more difficult to replace and/or adjust.

FIG. 3 illustrates the components of the preferred embodiment of the present invention. They are designed to avoid these and other problems in the prior art.

Specifically, FIG. 3 shows specially designed king pin or fasteners 85, which is comprised of an elongated shank or shaft, a specially-designed bolt head 90, and a specially designed washer 100.

In addition to these special designed components (the exact details of which are discussed below), it should be noted that the assembly sequence of the apparatus shown in FIG. 3 is very much opposite of the assembly sequence used in the prior art, as shown in FIG. 2 and discussed above.

Specifically, nut 70 is first inserted in pocket 50 of base plate 30 in the preferred embodiment of the present invention. A first compressible bushing (not shown) is then positioned over opening 37 followed by truck 25 which is positioned in slots 40 and 45. King pin 85 is then inserted through washer 100 and second compressible bushing 110. King pin 85 is then inserted through an opening (not shown) in truck 25, the first compressible bushing (not shown), and into opening 37 in base plate 30. It is then screwed into nut 70 until the desired attachment pressure is achieved.

As can be seen by comparing FIGS. 2 and 3, use of the preferred embodiment of the present invention in the manner described eliminates the presence of the rough, sharp threaded end of king pin 65, which previously protruded from the track. Moreover, the portion which does protrude, namely head 90 and washer 100, is specially tapered (as hereinafter described) so as to substantially reduce the possibility of a "hang-up" or the degree of such a "hand-up" if contact between the protruding portion and the running surface does occur.

FIG. 4 illustrates a partial cross-sectional side view of specially-designed king pin 85 and its associated specially-designed washer 100, all in accordance with the preferred embodiment of the present invention.

As can be seen in FIG. 4, Allen head 90 includes hex key 125 embedded in head 90 which is designed to receive an Allen wrench for applying torque to king pin 85. Although an embedded hex key is shown in the preferred embodiment, it is to be understood that other types of torque receiving keys could also be advantageously used, such as a key designed to receive phillips screw driver, or a conventional screwdriver blade.

Head 90 of king pin 85 includes tapered outer surface 120. Surface 120 is tapered at an angle of about 45° from the plane which is perpendicular to the axis which passes through the center of the elongated portion of king pin 85.

Although 45° has been chosen for the preferred embodiment, it is to be understood that a different angle could be used within the scope of the subject invention, but preferably greater than 20° and less than 60° relative to the plane perpendicular to the axis of the king pin.

Head 90 further includes second tapered surface 130 which, in the preferred embodiment, makes a 139 angle with the elongated portion of king pin 85. Although such an angle has been chosen for the preferred embodiment, it is to be understood that a different angle could be used, all within the scope of the subject invention.

Beneath head 90 is specially-designed washer 100 containing opening 134 through which king pin 85 is inserted.

As can be seen in FIG. 4, washer 10 includes tapered outer surface 135 which is co-extensive with tapered outer surface 120 of bolt head 90. Accordingly, tapered outer surface 135 of washer 100 similarly makes an angle of about 45° with the plane perpendicular to the axis of the king pin 85.

It is to be understood that a different angle could be used for tapered outer surface 135 and still fall within the scope of the subject invention. As noted above, angles between 20° and 60° are prefered, and with no rough or sharp exposed surfaces to hang up in situations such as that shown in FIG. 1. Similarly, although tapered outer surfaces 120 and 135 are shown in FIG. 4 as being co-planar, it is to be understood that the subject invention also contemplates that the angle between their respective surface planes may be greater than zero. The important point is that perimeter edge 123 of outer surface 120 be the same as perimeter edge 123 of outer surface 135.

As also shown in FIG. 4, washer 100 includes inner tapered surface 133. In the preferred embodiment, this tapered surface is at a 139° incline from the center axis of king pin 85 and substantially mates together with tapered surface 130 of head 90. Although the present invention also contemplates the use of a different angle, the preferred embodiment will still have surfaces 133 and 130 in mating engagement.

As also shown in FIG. 4, specially-designed washer 100 includes overhanging lip 140 which, in conjunction with bottom indentation 143 and inner wall 145 create a cup-like recess which matingly receives bushing 75 (shown in FIG. 3).

FIG. 5 shows a transverse sectional view of FIG. 4 taken along line V—V.

In the preferred embodiment, king pin 85 has a length of 2½ inches, a shaft diameter of ⅜ inch, and, to maximize structural integrity, is only threaded at its lowermost ¾ inch portion. It, along with washer 100, should be made of a very hard, rigid and strong material which, in the preferred embodiment, is heat treated steel.

Although king pin 85 could be custom made, it can also advantageously be created by modifying a standard ⅜ by 3 inch Allen head or hex key flat head screw having an 82° countersink. It must merely have a portion removed from its head to form tapered surface 120 and ½ inch of its threaded end cut off.

FIG. 6 shows a perspective view of the bottom side of skateboard 5 having secured to it trucks 25 through the use of king pins (with heads 90 shown) being screwed through associated hardware into base plates 30.

FIG. 7 shows a close up of the perspective view in FIG. 6 of the lower truck assembly (the upper is the same), giving greater attention to the associated hardware. Specifically, as can be seen in FIG. 7, king pin 85 (only head 90 is shown) affixes truck 25 to base plate 30 by first going through washer 100, bushing 75, an opening in truck 25, lower bushing 110, and then into base plate 30.

Although king pin 85 and washer 100 have been described as two separate pieces, it is to be understood that they may also be a single integral piece, all within the scope of the present invention.

Similarly, although tapered surfaces 120 and 135 have been shown in the shape of a conical segment, these tapered surfaces could also have a rounded or spherical shape. The important point is that the cross-sectional area of bolt head 90 gradually increase from its protruding tip in a smooth fashion such that there are no rough or sharply protruding edges or corners.

Having thus described an exemplary embodiment of the present invention, it should be understood by those skilled in the art that the within disclosure is exemplary only and is not an exhaustive listing of all of the materials and process parameters and that various other alternatives, adaptions and modifications may be made within the scope of the present invention. Accordingly, the present invention is not limited to the specific embodiments described and/or illustrated herein, but only by the following claims.

What is claimed is:

1. Apparatus for attaching a skateboard truck having an opening therein to a skateboard base plate having an opening therein, the opening in the base plate including a pocket in which a threaded nut may be seated comprising:

a. an elongated member made of heat treated steel being threaded at one end thereof for insertion through the opening in the truck and the opening in the base plate and for screwable engagement with the threaded nut;

b. a head made of heat treated steel affixed to the other of said elongated member, including means embedded within it for receiving a torque-applying tool, said head protruding from the skateboard following installation such that there is no other structure which interfaces with the force of a grind on said head, and said head including a first outer surface substantially perpendicular to said elongated member, a second outer surface being connected to said first outer surface and frusto-conically shaped to bear the force of a grind over the entire length of a line tangent to said second outer surface and making an angle of between 20° and 60° with the plane perpendicular to the axis passing through said elongated member; and a tapered inner surface connected to said second outer surface and to said elongated member; and c. a washer made of heat treated steel through which said elongated member is inserted before insertion into the opening of the truck and base plate, said washer having a tapered outer surface which is frusto-conically shaped and which is substantially co-extensive with the outer surface of said head when said washer is mated with said head and a tapered inner surface connected to said outer surface which substantially mates with the inner surface of said head when said washer is mated with said head, said washer further having a portion which does not mate with said head when said washer is mated with said head, said portion having a portion formed therein.

* * * * *